United States Patent Office 3,813,251
Patented May 28, 1974

---

3,813,251
PEPTIZERS FOR PHOTOGRAPHIC EMULSIONS
Kenneth R. Hollister and Ernest J. Perry, Rochester, N.Y., assignors to Eastman Kodak Company, Rochester, N.Y.
No Drawing. Filed Apr. 28, 1972, Ser. No. 248,442
Int. Cl. G03c 1/04
U.S. Cl. 96—114    15 Claims

ABSTRACT OF THE DISCLOSURE

A photographic silver halide emulsion contains a peptizer comprising a polymer consisting essentially of:

(A) About 3 to about 35 mole percent of units of the structure

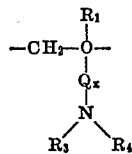

wherein $R_1$ is hydrogen or a methyl radical, Q is

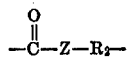

wherein Z is oxygen or =NH and $R_2$ is an alkylene radical of from 1 to 6 carbon atoms, $x$ is zero or one, and $R_3$ and $R_4$ are either (1) taken together and represent the atoms necessary to complete a 5 or 6 membered heterocyclic ring, or (2) are independently selected from the group consisting of alkyl radicals of from 1 to 8 carbon atoms, but only when $x$ is equal to one;

(B) About 30 to about 92 mole percent of units of the structure

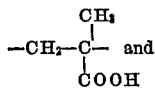

(C) About 5 to about 65 mole percent of units of the structure

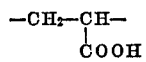

BACKGROUND OF THE INVENTION

This invention relates to photography and more particularly to photographic emulsions containing polymeric materials compatible therewith and methods of preparing photographic emulsions utilizing certain polymeric materials.

The initial steps in the preparation of a photographic silver halide emulsion are usually precipitation and ripening. A peptizing agent, to be effective, plays a significant role in each of these steps. Gelatin is generally used as a peptizer in commercial emulsions, but certain disadvantages are associated with its use. Gelatin is susceptible to attack by molds and bacteria. Also as a further consequence of the natural origin of gelatin, a supply from a given source often varies in properties from time to time. Finally, the use of gelatin restricts the type of crystal irregularities obtainable by a given emulsion precipitation procedure to those types which are related to the inherent colloid-chemical nature of gelatin.

Many attempts have been made to prepare satisfactory synthetic polymeric peptizers for silver halide emulsions. However, these materials are frequently unsatisfactory or only partially satisfactory. In certain instances, for example, when one attempts to obtain emulsions known to those skilled in the art as "neutral emulsions" in the presence of polyacrylamide, the peptizing action of this polymer proves to be inadequate and extensive clumping of the emulsion grains occurs. Other polymers, for example poly(vinyl alcohol) or poly(vinylpyrrolidone) provide adequate peptization but exert such potent restraint on grain growth that the emulsion grains obtained are too small for most applications. Various modifications of poly(vinyl alcohol) have previously been made to provide silver halide peptizers, but these derivatives have been met by only limited success.

U.S. Pat. 3,615,624 discloses sulfide-bearing polymers useful as silver halide peptizers. Belgian Pat. 762,833 discloses certain peptizers, among them the terpolymers 1/7/2 3-thiapentyl acrylate/methacrylic acid/dimethylaminoethyl methacrylate, 1/7/2 3-thiapentyl methacrylate/methacrylic acid/diethylaminoethyl methacrylate and 1/7/2 3-thiapentyl acrylate/methacrylic acid/diethylaminoethyl methacrylate which confer the capability of coagulation, washing and redispersion of the silver halide grains by manipulation of the acidity of the medium. Belgian Pat. 561,161 describes copolymers of diethylaminoethyl methacrylate and methacrylic acid which are said to be useful as silver halide peptizers. U.S. Pat. 3,084,132 describes copolymers of dimethylaminoethyl methacrylate, diethylaminoethyl methacrylate, or vinyl pyrrolidone with certain crosslinkable comonomers such as N,N'-methylenebisacrylamide. British 889,760 describes photographic uses for such polymers as methacrylic acid/vinyl pyridine, diethylamine ethylmethacrylate (sic)/methacrylic acid and vinylpyridine/methacrylic acid/methyl methacrylate. British Pat. 1,005,404 relates to a flocculation method for removing extraneous soluble salts by employing polymers of 15–70 mole percent of ring saturated 2-oxo-N-vinyl heterocyclic compound and 30–85 mole percent of a water-soluble salt of acrylic acid or methacrylic acid. Japanese Publication 14153/69 describes silver halide color sensitive material containing a copolymer including water- or alkali-soluble 1-vinyl-2-methylimidazole polymer and/or 1-vinyl-2-methylimidazole. Copolymers of N,N-dialkylaminoalkyl acrylates and alkyl acrylates are disclosed in Product Licensing Index, Vol. 85, May, 1971, item 8525, pages 30–32. Copending U.S. Patent Application Ser. No. 213,807, filed Dec. 29, 1971 and entitled "Photographic Emulsions" relates to polymeric peptizers which can contain acrylic and methacrylic acids polymerized with certain quaternary ammonium salts.

U.S. 3,385,839 describes polymers containing 1–99% by weight of a hydroxy ester of acrylic or methacrylic acid, 99–1% of a quaternary ammonium salt which may, for example, be 2-trimethylammoniumethyl methacrylate methosulphate and up to 80% by weight of other monomers which do not have a cross-linking reaction and which may, for example, be acrylic or methacrylic acid.

U.S. 2,677,679 describes the preparation of quaternary ammonium polymers of the acrylic type, e.g., methacryloxyethyltrimethylammonium methyl sulfate. Copolymers containing, for example, acrylonitrile, methyl acrylate or methacrylamide are also described.

In addition to the above references, work has been published by T. Yano and co-workers in which polymers involving imidazole moieties are used as silver halide peptizers. The following references describe that work: T. Yano, Photographische Korrespondenz, 104, 121 (1968); T. Yano and S. Iguchi, J. Soc. Sci. Phot. Japan (English Edition), No. 18, 20 (1968) and 27 (1968); T. Yano, N. Itoh, and S. Iguchi, J. Sci. Phot. Japan, 29, 22 (1966), 30, 10 (1967), and 30, 83 (1967); T. Yano, Memoirs of the Faculty of Industrial Arts, Kyoto Technical University, Science and Technology, 18, 123 (1969).

SUMMARY OF THE INVENTION

One object of this invention is to provide new photographic emulsions of excellent stability. Another object of this invention is to provide novel silver halide dispersions of excellent stability. Still another object of this invention is to provide silver halide grains which possess photographically desirable dimensional and crystallographic properties.

A further object of this invention is to provide a novel photographic element containing therein a polymeric gelatin-substitute.

Still another object of this invention is to provide polymeric materials which effectively peptize the silver halide formed by the double decomposition reaction from aqueous solutions of alkali halide salts and solutions of soluble silver salts.

Another object of this invention is to provide novel photographic emulsions which exhibit good physical development characteristics.

Still another object of this invention is to provide polymers which function effectively as silver halide peptizers and which, in addition, confer the capability of coagulation, washing and redispersion of the silver halide grains.

It is another object of this invention to provide peptizers in which the coagulation, washing and redispersion steps can be accomplished effectively and easily without loss of silver halide grains by simply manipulating the acidity of the medium.

Other objects and advantages of this invention will be apparent from the following description.

In accordance with the present invention, certain polymers of tertiary amine-containing monomers and carboxylic acid monomers are provided which are excellent silver halide peptizers which also confer the capability of a convenient method for the coagulation, washing, and redispersion of the silver halide grains. Coagulation, washing and redispersion can be effected easily and effectively without loss of silver halide grains by manipulating the acidity of the medium.

More specifically, the peptizers of the present invention comprise polymers consisting essentially of:

(A) About 3 to about 35 mole percent of units of the structure

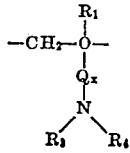

wherein $R_1$ is hydrogen or a methyl radical, Q is

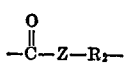

wherein Z is oxygen or =NH and $R_2$ is an alkylene radical of from 1 to 6 carbon atoms, $x$ is zero or one, and $R_3$ and $R_4$ are either
 (1) taken together and represent the atoms necessary to complete a 5- or 6-membered heterocyclic ring, or
 (2) are independently selected from the group consisting of alkyl radicals of from 1 to 8 carbon atoms, but only when $x$ is equal to one;

(B) About 30 to about 92 mole percent of units of the structure

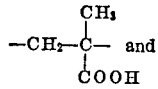 and (C) About 5 to about 65 mole percent of units of the structure $$-CH_2-CH-$$
$$\phantom{-CH_2-}COOH$$

DESCRIPTION OF THE PREFERRED EMBODIMENTS

The polymers of this invention are excellent substitutes for gelatin in photographic applications, since they exhibit not only excellent salt tolerance, but also excellent photographic inertness and utility at temperatures below which gelatin can ordinarily be employed in the making of photographic emulsions. Further, they permit the production of silver halide grains having morphologies different from those which can be obtained with gelatin. In addition, these copolymers exhibit good compatibility with gelatin which makes it possible, if desired, to replace only a small part of the gelatin in a photographic composition, depending upon the particular combination of properties desired.

A significant feature of this invention is that the properties which make the polymers employed in the practice of this invention suitable gelatin substitutes are very closely related to the concentration of the monomers from which the polymers are prepared. Thus, it is critical to the present invention that the tertiary amine-containing units comprise from about 3 mole percent to about 35 mole percent of the polymer. Preferably, they will be present in the range of from about 5 to about 25 mole percent.

Polymerized methacrylic acid units comprise from about 30 to about 92 mole percent of the polymers employed in the practice of this invention. Preferably, they comprise from about 35 to about 75 mole percent and, more preferably, from about 40 to about 70 mole percent.

The polymerized acrylic acid units which comprise the third component of the polymers employed in the practice of this invention are present in the range of from about 5 mole percent to about 65 mole percent. Preferably, the range extends from about 5 to about 50 mole percent and, more preferably, from about 10 to about 46 mole percent. Outside of the foregoing ranges for the three components, the peptization characteristics of the polymer will be significantly diminished and the advantage which they provide of allowing the use of convenient and particularly effective means of coagulation, washing and redispersion of the silver halide grains will be essentially lost.

As pointed out above, the polymers employed in the practice of this invention contain units having at least one tertiary amine group. These units are of the structure

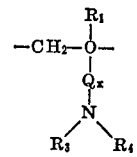

and are generally, but not necessarily, introduced into the polymer by copolymerization of the corresponding ethylenically unsaturated compound, i.e.

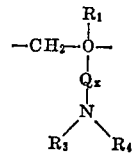

with acrylic acid and methacrylic acid. It would be possible, of course, particularly where the tertiary amine-containing unit is an ester or an amide, to polymerize the corresponding acid, ester, or the like with the acrylic and methacrylic acids and then to form the ester or amide after polymerization, if such a procedure should be convenient and desirable in a given case.

In the foregoing structural formulas, $R_1$ is hydrogen or a methyl radical. It is preferred that $R_1$ be hydrogen when $x$ is zero and methyl when $x$ is one. As pointed out above, $x$ must be either zero or one.

Q is

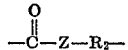

wherein Z is oxygen or $=NH$, preferably oxygen, and $R_2$ is an alkylene radical of from 1 to 6 carbon atoms, e.g. methylene, ethylene, trimethylene, tetramethylene, pentamethylene, hexamethylene and isomers of the foregoing. Methylene and ethylene are preferred, ethylene being the most preferred.

$R_3$ and $R_4$ can be taken together to form a heterocyclic ring compound of 5 or 6 members wherein the other atoms of the ring can be carbon, oxygen or sulfur. There can, of course, be more than one nitrogen atom in this 5- or 6-membered ring. These rings can, if desired, also be substituted with, for example, alkyl groups, alkoxy groups, halogens and the like. Methyl substituted rings are especially useful.

As exemplary of monomers which may be polymerized to form such ringed moieties in the polymers employed in this invention can be listed N-vinylpyrazole, N-vinylimidazole, N-vinyltriazole, N-vinylindole, N-vinylindazole, N-vinylmorpholine, methacryloyloxyethylpyridine, methacryloyloxyethylpyridazine, acryloyloxyethylpyridine, acryloyoxymethylpyridine, methacryloyloxymethylpyrazine, methacryloyloxyethylimidazole and the like. Vinylimidazoles and substituted vinylimidazoles, especially alkyl-substituted vinylimidazoles, such as 2-methyl-1-vinylimidazole are preferred.

Alternatively, in those cases where $x$ is equal to one, $R_2$ and $R_3$ can be independently selected from the group consisting of alkyl radicals of from 1 to 8 carbon atoms, e.g., methyl, ethyl, propyl, butyl, pentyl, hexyl, heptyl, octyl and isomers of the foregoing. It is preferred that $R_2$ and $R_3$, when they are alkyl radicals, be independently selected from those alkyl radicals comprising from 1 to 4 carbon atoms and most preferred that both $R_2$ and $R_3$ be methyl.

As exemplary of those monomers which can be polymerized to form such moieties in the polymers employed in the practice of this invention can be listed N,N-diethylaminoethyl methacrylate; N,N - dimethylaminoethyl methacrylate; N,N-dimethylaminoethyl methacrylate; N,N-diethylaminomethyl methacrylate; N,N-dibutylaminoethyl acrylate; N,N-dimethylaminoethyl acrylate; N-ethyl, N-methylaminopropyl methacrylate; N,N-dioctylaminomethyl acrylate and the like. The preferred compounds are N,N-dimethylaminoethyl methacrylate and N,N-diethylaminoethyl methacrylate.

References to various photographic silver halide emulsions, preparations, addenda, processing and systems have been published in Product Licensing Index, Vol 92, December 1971, publication 9232, pages 107–110. Paragraphs I, III–VII and IX–XXV of this publication are applicable to the peptizers employed in the practice of this invention and to the emulsions, photographic elements and systems resulting from their use. Accordingly, these paragraphs are incorporated herein by reference.

The following examples are included for a further understanding of the invention.

EXAMPLE 1

Poly[1-vinylimidazole-co-methacrylic acid-co-acrylic acid] (mole ratio 1:3.5:0.5)

Polymer preparation.—A flask was charged with 56.4 g. (0.60 mole) of 1-vinylimidazole, 180.6 g. (2.10 moles) of methacrylic acid, 21.6 g. (0.30 mole) of acrylic acid, 2.58 g. of potassium persulfate, 0.86 g. of sodium metabisulfite, and 1000 ml. of distilled water. After purging the solution with nitrogen for 20 minutes, it was heated to 80° C. with stirring for 1½ hours. The system was then kept at 80° C. without stirring an additional 2½ hours. A small sample of the white polymer which precipitated during the course of the reaction was dried under vacuum for analysis.

Analysis calculated for $C_{41}H_{58}N_4O_{16}$: C, 57.1; H, 6.8; N, 6.5. Found: C, 58.6; H, 7.8; N, 5.9.

The inherent viscosity in 1 M NaCl (0.25 g./deciliter of solution) at 25° C., was found to be 1.65.

After washing the remainder of the polymer thoroughly in distilled water, it was dissolved in water with stirring and the addition of enough dilute aqueous sodium hydroxide to bring the pH to 6.0.

Silver halide emulsion preparation.—A silver halide emulsion was prepared in the presence of this polymer by essentially the same process described by Merrill and Perry in Example 1 of British Pat. 1,057,976, as follows:

A beaker was charged with a solution of 5.0 g. (solids) of the above polymer, 30.37 g. of potassium bromide, 0.93 g. of potassium iodide and a total of 279 ml. of distilled water. After adjusting the pH of the solution to 6.0, it was stirred continuously at 50° C. while a solution of 35.37 g. of silver nitrate in 185 ml. of water was added at constant rate over 18 minutes. The smooth emulsion thus formed was then cooled to room temperature.

Emulsion coagulation and redispersion.—A 50 ml. sample of the emulsion was stirred at room temperature as the pH was lowered to about 4.3 with dilute sulfuric acid. The emulsion coagulated and settled into a compact pad at the bottom of the vessel when the stirring was stopped. After a few minutes the clear supernatant liquid was decanted and replaced with distilled water. The decanting process was convenient and effective and occurred without loss of precipitate. Upon stirring, the precipitate broke up into small discrete particles. Raising the pH back to 6.0 with dilute aqueous sodium hydroxide caused rapid reformation of a smooth dispersion which did not settle out on standing. The process of coagulation, decantation, and redispersion was repeated, and it occurred just as conveniently and effectively as the first time.

The experiment was repeated at 40° C. with similar results except that the coagulation was somewhat more rapid and the precipitated pad somewhat more compact.

EXAMPLE 2

Poly[1-vinylimidazole-co-methacrylic acid-co-acrylic acid] (mole ratio 1:2:2)

Polymer preparation.—A flask was charged with 4.7 g. (0.05 mole) of 1-vinylimidazole, 8.6 g. (0.10 mole) of methacrylic acid, 7.2 g. (0.10 mole) of acrylic acid, 0.21 g. of potassium persulfate, 0.07 g. of sodium metabisulfite, and 81 ml. of distilled water. After purging the solution with nitrogen for 15 minutes, it was heated at 80° C. for 4 hours. A small sample of the white polymer which precipitated during the course of the reaction was dried under vacuum for analysis.

Analysis calculated for $C_{19}H_{26}N_2O_8$: C, 55.6; H, 6.4; N, 6.8. Found: C, 50.9; H, 6.9; N, 4.9.

The inherent viscosity of the polymer in 0.1 M NaCl (0.25 g./deciliter of solution) at 25° C. was 1.64.

After washing the remainder of the polymer thoroughly in distilled water, it was dissolved in water with agitation and the addition of enough dilute aqueous sodium hydroxide to bring the pH to 6.0.

Silver halide emulsion preparation.—A smooth, well-dispersed silver halide emulsion was prepared in the presence of this polymer by the procedure of Example 1.

Emulsion coagulation and redispersion.—The silver halide emulsion prepared above was tested for coagulation and redispersion by the procedure described in Example 1. This emulsion coagulated significantly more rapidly and formed a precipitated pad which was even more compact and convenient to handle than that of Example 1. Despite the compactness of the pad, it redispersed very rapidly and conveniently on change of pH.

EXAMPLE 3

Poly[1-vinylimidazole-co-methacrylic acid-co-acrylic acid] (mole ratio 1:3:3)

Polymer preparation.—A flask was charged with 23.5 g. (0.25 mole) of 1-vinylimidazole, 64.5 g. (0.75 mole) of methacrylic acid, 54.0 g. (0.75 mole) acrylic acid, 1.42 g. of potassium persulfate, and 0.47 g. of sodium metabisulfite in 568 ml. of distilled water. After purging the solution with nitrogen for 15 minutes, it was heated at 80° C. for 4 hours. A small sample of the white polymer which precipitated during the course of the reaction was dried under vacuum for analysis.

Analysis calculated for $C_{29}H_{38}N_2O_{12}$: C, 57.6; H, 6.0; N, 4.6. Found: C, 53.0; H, 6.4; N, 3.9.

The inherent viscosity of the polymer in 1 M NaCl (0.25 g./deciliter of solution) at 25° C. was 1.05.

Silver halide emulsion preparation.—A smooth, well-dispersed silver halide emulsion was prepared in the presence of this polymer by the procedure of Example 1.

Emulsion coagulation and redispersion

The silver halide emulsion prepared above was tested for coagulation and redispersion in the manner described in Example 1. The results were essentially the same as those described in Example 1.

EXAMPLE 4

Poly[2-methyl-1-vinylimidazole-co-methacrylic acid-co-acrylic acid] (mole ratio 1:2:2)

Polymer preparation.—A flask was charged with 108.0 g. (1.0 mole) of 2-methyl-1-vinylimidazole, 172.0 g. (2.0 moles) of methacrylic acid, 144.0 g. (2.0 moles) of acrylic acid, 4.24 g. of potassium persulfate, 1.41 g. of sodium metabisulfite, and 1696 ml. of distilled water. After purging the solution with nitrogen for 20 minutes, it was heated to 80° C. for 5 hours. A small sample of the rubbery white polymer which precipitated during the course of the reaction was dried under vacuum for analysis.

Analysis calculated for $C_{10}H_{14}NO_4$: C, 56.6; H, 6.6; N, 6.6. Found: C, 55.8; H, 6.6; N, 6.7.

Inherent viscosity in 1 M NaCl—1.08.

After washing the remainder of the polymer thoroughly in water, it was dissolved in distilled water with stirring and the addition of enough dilute aqueous sodium hydroxide to bring the pH to 6.0.

Silver halide emulsion preparation.—A smooth, well-dispersed silver halide emulsion was prepared in the presence of this polymer in the manner described in Example 1.

Emulsion coagulation and redispersion.—The silver halide emulsion prepared above was tested for coagulation and redispersion in the manner described in Example 1. The results were essentially the same as those described in Example 1.

EXAMPLE 5

A high-speed silver bromoiodide (94.6) negative emulsion similar to the type of emulsion described by Trivelli and Smith (Phot. J., vol. 79, 330) was prepared, using poly[1 - vinylimidazole-co-methacrylic acid-co - acrylic acid] (mole ratio 1:2:2), prepared as described in Example 2 as the peptizer. Removal of soluble salts was accomplished by lowering the pH of the emulsion to 4.1 with dilute sulfuric acid, allowing the silver halide coagulum to settle, removing the supernatant liquid by siphoning, replacing the supernatant liquid with distilled water, redispersing the emulsion by raising the pH to 6.0 with dilute sodium hydroxide solution, and repeating the above coagulation-redispersion cycle two more times. The resulting emulsion was digested to optimum speed, dispersed in gelatin (130 g. gelatin per silver mole), mixed with customarily employed adjuvants and coated on a transparent support so as to yield a silver coverage of 540 mg./ft.$^2$ silver and 650 mg./ft.$^2$ gelatin. Exposure (500 W, 5400° K.) and development [5 minutes in Kodak DK–50 developer (68° F.)] yielded the following sensitometric data as compared to a similarly prepared, gelatin-peptized emulsion:

| Emulsion | Relative speed | Gamma | Net fog (total fog—base density) |
|---|---|---|---|
| Polymer-peptized | 10.7 | 1.00 | 0.04 |
| Gelatin-peptized | 100 | 0.87 | 0.06 |

EXAMPLE 6

An emulsion was prepared as described in Example 5, except that poly[1-vinylimidazole-co-methacrylic acid-co-acrylic acid] (mole ratio 1:3:3) was used as the peptizer. The sensitometric data obtained after exposure and processing were as follows:

Relative speed*: 11.2
Gamma: 1.25
Net fog: 0.05

*The relative speed of a gelatin-peptized emulsion=100.

EXAMPLE 7

Silver halide dispersions peptized with poly[2-(N,N-dimethylamino)ethyl methacrylate-co-methacrylic acid co-acrylic acid] (mole ratio 1:5:1)

A solution of 215.0 g. of methacrylic acid and 36.0 g. of acrylic acid in 1000 ml. of water was slowly added to a solution of 78.5 g. of 2-(N,N-dimethylamino)ethyl methacrylate in 2000 ml. of water. The warm solution thus formed was treated with 3.3 g. of potassium persulfate, 1.1 g. of sodium metabisulfite, and 290 ml. of water. It was then purged with nitrogen for 30 minutes and subsequently heated at 80° C. with stirring for 4 hours. During that time a rubbery, sticky, white polymer gradually came out of solution in a form resembling cottage cheese. Upon cooling the aqueous supernatant was decanted and the polymer washed thoroughly with water. A small sample of the polymer was removed and dried for analysis.

Calculated for $C_{31}H_{49}NO_{14}$: 56.4% C, 7.5% H, 2.1% N. Found: 55.6% C, 7.5% H, 2.1% N.

Inherent viscosity of 0.1 M NaCl: 1.45.

The rest of the polymer was dissolved in water with the addition of dilute aqueous sodium hydroxide and agitation. A clear solution resulted containing 8.9% solids and having a pH of 6.0.

A silver halide dispersion was then prepared in the presence of this polymer by essentially the same process described by Merrill and Percy in Example 1 of British Pat. 1,057,976, as follows:

A beaker was charged with 56.2 g. of the above polymer solution, 30.37 g. of potassium bromide, 0.93 g. of potassium iodide, and 227 ml. of water. After adjusting the pH of the solution to 6.0 it was stirred continuously at 50° C. while a solution of 35.37 g. of silver nitrate in 185 ml. of water was added at constant rate over 20 minutes. The smooth dispersion thus formed was then cooled to room temperature.

A 50 ml. sample of the dispersion was then stirred at 40° C. as the pH was lowered to 4.3 with dilute sulfuric acid. The dispersion coagulated and settled into a compact pad at the bottom of the vessel when the stirring was stopped. After a few minutes the clear supernatant liquid was decanted and replaced with distilled water. The decanting process was very convenient and effective and occurred without loss of precipitate. Upon stirring the precipitate broke up into small discrete particles. Raising the pH back to 6.0 with dilute aqueous sodium hydroxide caused rapid reformation of a smooth dispersion which did not settle out on standing. The processes of coagulation, decantation, and redispersion were repeated twice more, occurring just as conveniently and effectively as the first time.

EXAMPLE 8

Silver halide dispersions peptized with poly[2-(N,N-dimethylamino)ethyl methacrylate-co-methacrylic acid-co-acrylic acid] (mole ratio 1:3:1)

A polymer was prepared in the manner described in Example 7 except that it was prepared from 157.0 g. of 2-(N,N-di-methylamino)ethyl methacrylate, 258.0 g. of methacrylic acid and 72.0 g. of acrylic acid.

Analysis calculated for $C_{23}H_{37}NO_{10}$: 56.7% C, 7.7% H, 2.9% N. Found: 53.1% C, 7.7% H, 2.5% N.

Inherent viscosity in 0.1 M NaCl: 1.81.

A sample of this polymer was used to prepare a silver halide dispersion in the same manner as that described in Example 7.

The smooth silver halide dispersion thus formed was coagulated, washed, and redispersed in the same manner as that described in Example 7. The process was very convenient and effective, and occurred without loss of silver halide grains. A similar sequence of operations was carried out on an identical sample at 25° C. Under these conditions the precipitation of the coagulated grain system is slightly slower, but is just as convenient and effective as that above and similarly occurs without loss of silver halide grains.

EXAMPLE 9

Silver halide dispersions peptized with poly[2-(N,N-dimethylamino)ethyl methacrylate-co-methacrylic acid-co-acrylic acid (mole ratio 1:3.5:0.5)

A polymer was prepared in the manner described in Example 7 except that it was prepared from 157.0 g. of 2-(N,N-dimethylamino)ethyl methacrylate, 301.0 g. of methacrylic acid, and 36.0 g. of acrylic acid.

Analysis calculated for $C_{47}H_{76}N_2O_{20}$: 57.0% C, 7.7% H, 2.8% N. Found: 52.7% C, 7.7% H, 3.1% N.

Inherent viscosity in 0.1 M NaCl: 1.61.

A sample of this polymer was used to prepare a silver halide dispersion in the same manner as that described in Example 7.

The smooth silver halide dispersion thus formed was coagulated, washed and redispersed in the same manner as that described in Example 7. The process was very convenient and effective, and occurred without loss of silver halide grains.

EXAMPLE 10

Comparison with prior art

This example illustrates: (i) The substantial loss of silver halide which occurs when an emulsion, peptized by poly[2 - (N,N - diethylamino)ethyl methacrylate-co-methacrylic acid] (mole ratio 1:4.18), prepared as described in Example 3 of Belgian Pat. 561,161, is freed from soluble salts by a process involving coagulation through adjustment of the emulsion. (ii) The efficient way in which a similarly prepared and handled emulsion, peptized by poly[2-(N,N-dimethylamino)ethyl methacrylate-co-methacrylic acid-co-acrylic acid (mole ratio 1:3:1)], can be freed from soluble salts without significant loss of silver halide during coagulation and redispersion through changes in emulsion pH. (iii) The excellent photographic properties of the emulsion, referred to in (ii) which, after coating in gelatin as the vehicle, yielded a higher speed/fog ratio than a similarly prepared emulsion, peptized by gelatin.

(A) A high-speed silver bromoiodide (94:6) negative emulsion, similar to the type of emulsion described by Trivelli and Smith (Phot. J. Vol. 79, 330), was prepared using poly[2-(N,N-diethylamino)ethyl methacrylate-co-methacrylic acid] (mole ratio 1:4.18) as the peptizer.

The latter polymer had been prepared as described in Example 3 of Belgian Pat. 561,161. Removal of soluble salts was accomplished by lowering the pH of the emulsion to 4.4 with dilute sulfuric acid, allowing the silver halide coagulum to settle, removing the supernatant liquid by siphoning, replacing the supernatant liquid with distilled water, redispersing the emulsion by raising the pH to 6.0 with dilute sodium hydroxide solution, and repeating the above coagulation-redispersion cycle. The coagulum, obtained after lowering the pH as described above, failed to cohere satisfactorily, even when settling of the emulsion was permitted to occur for more than 15 hours. Removal of the supernatant liquid by siphoning was thus necessarily inefficient and resulted in a loss of 51% of silver halide as determined by a silver analysis which was carried out after preparation of this emulsion had been completed.

(B) An emulsion was prepared in the same manner as A except that the peptizer used was poly[2-(N,N-dimethylamino)ethyl methacrylate-co-methacrylic acid-co-acrylic acid (mole ratio 1:3:1)]. The coagulum obtained after lowering the pH of the emulsion to 4.4 by addition of dilute sulfuric acid cohered satisfactorily and removal of the supernatant liquid containing the soluble salts, present in the emulsion, could be carried out very efficiently after each of two emulsion coagulations. The loss in silver halide, incurred during the two coagulation-redispersion cycles, then amounted to only 5% as determined by a silver analysis.

(C) The emulsion described in B was digested to optimum speed, dispersed in gelatin (200 g. gelatin per silver mole), mixed with customarily employed adjuvants and coated on a transparent support, so as to yield a silver coverage of 540 mg./ft.$^2$ silver and 1000 mg./ft.$^2$ gelatin. Exposure (500 W, 5400° K.) and development [5 minutes in Kodak DK–50 developer (68° F.)] yielded the following sensitometric data as compared to a similarly prepared, gelatin-peptized emulsion:

| Emulsion | Relative speed | Gamma | Net fog (total fog−base density) |
|---|---|---|---|
| Polymer-peptized | 100 | 1.05 | 0.03 |
| Gelatin-peptized | 74 | 1.15 | 0.03 |

EXAMPLE 11

Comparison with prior art (A) Poly(4-vinylpyridine-co-methacrylic acid) (mole ratio 2.37:1) was prepared in the same manner as described in Example 1 of British Pat. 889,760.

An attempt was then made to prepare a silver halide dispersion using this material as the peptizer in the manner described in Example 1, supra. Instead of forming a stable silver halide emulsion, however, this material settled as soon as the stirring stopped.

(B) Poly(1-vinylimidazole-co-methacrylic acid) (mole ratio 2.37:1) was prepared in the same manner and ratio as the polymer of Example 1 of British Pat. 889,760 except that 1-vinylimidazole was substituted for the vinylpyridine.

An attempt was then made to prepare a silver halide emulsion using this material as the peptizer in the manner described in Example 1, supra. Instead of forming a stable silver halide emulsion this material also settled as soon as the stirring was stopped.

(C) Poly(1-vinylimidazole - co - methacrylic acid-co-acrylic acid) (mole ratio 1:5:5) was prepared in the same manner as Example 1, supra, except that the ratio of monomers was changed to 1:5:5. The polymer thus formed was similar in appearance to that of Example 1.

Analysis calculated for $C_{40}H_{56}N_2O_{20}$: C, 54.3%; H, 6.4%− N, 3.2%. Found: C, 53.5%; H, 6.5%; N, 3.5%.

Inherent viscosity in 1 M NaCl=1.24.

A silver halide emulsion was prepared and tested for coagulation and redispersion as described in Example 1 except that the above polymer was used as the peptizer. The behavior of the resulting emulsion was very similar to that of Example 1, performing all operations conveniently and effectively.

The invention has been described in detail with particular reference to certain preferred embodiments thereof, but it will be understood that variations and modifications can be effected within the spirit and scope of the invention.

What is claimed is:

1. A photographic silver halide emulsion containing a peptizer consisting essentially of a polymer consisting essentially of:

(A) about 3 to about 35 mole percent of units of the structure

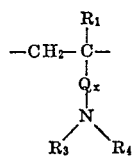

wherein $R_1$ is hydrogen or a methyl radical, Q is

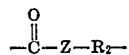

wherein Z is oxygen or $=NH$ and $R_2$ is an alkylene radical of from 1 to 6 carbon atoms, $x$ is zero or one and $R_3$ and $R_4$ are either (1) taken together and represent the atoms necessary to form an imidazole or substituted imidazole ring, or (2) are independently selected from the group consisting of alkyl radicals of from 1 to 8 carbon atoms, but only when $x$ is equal to one;

(B) about 30 to about 92 mole percent of units of the structure

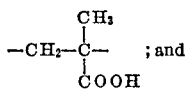; and (C) about 5 to about 65 mole percent of units of the structure

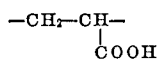

2. A photographic silver halide emulsion containing a peptizer consisting essentially of a polymer consisting essentially of:

(A) about 3 to about 35 mole percent of units of the structure

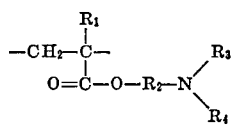

wherein $R_1$ is hydrogen or a methyl radical, $R_2$ is an alkylene radical of from 1 to 6 carbon atoms and $R_3$ and $R_4$ are independently selected from the group consisting of alkyl radicals of from 1 to 8 carbon atoms;

(B) about 30 to about 92 mole percent of units of the structure

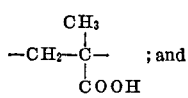; and (C) about 5 to about 65 mole percent of units of the structure

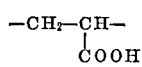

3. The photographic silver halide emulsion of claim 2 wherein $R_1$, $R_3$ and $R_4$ are methyl radicals.

4. The photographic silver halide emulsion of claim 3 wherein $R_2$ is an ethylene radical.

5. A photographic silver halide emulsion containing a peptizer consisting essentially of a polymer consisting essentially of:

(A) about 3 to about 35 mole percent of units of the structure

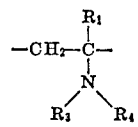

6. The photographic silver halide emulsion of claim 5 wherein the units of part A are polymerized 1-vinylimidazole units.

7. The photographic silver halide emulsion of claim 5 wherein the units of part A are polymerized 2-methyl-1-vinylimidazole units.

8. A method of preparing a photographic silver halide emulsion comprising precipitating a photographic silver halide in the presence of a peptizer consisting essentially of a polymer consisting essentially of:

(A) about 3 to about 35 mole percent of units of the structure

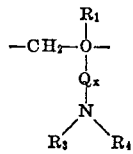

wherein $R_1$ is hydrogen or a methyl radical, Q is

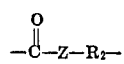

wherein Z is oxygen or $=NH$ and $R_2$ is an alkylene radical of from one to six carbon atoms, $x$ is zero or one, and $R_3$ and $R_4$ are either (1) taken together and represent the atoms necessary to form an imidazole or substituted imidazole ring, or (2) are independently selected from the group consisting of alkyl radicals of from one to eight carbon atoms, but only when x is equal to one;

(B) about 30 to about 92 mole percent of units of the structure

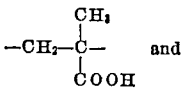 and (C) about 5 to about 65 mole percent of units of the structure

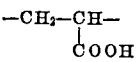

9. A photographic element comprising a support having coated thereon a photographic silver halide emulsion containing a peptizer consisting essentially of a polymer consisting essentially of:

(A) about 3 to 35 mole percent of units of the structure

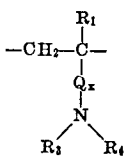

wherein $R_1$ is hydrogen or a methyl radical,
Q is

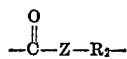

wherein Z is oxygen or $=NH$ and $R_2$ is an alkylene radical of from one to six carbon atoms, $x$ is zero or one, and $R_3$ and $R_4$ are either
  (1) taken together and represent the atoms necessary to form an imidazole or substituted imidazole ring, or
  (2) are independently selected from the group consisting of alkyl radicals of from one to eight carbon atoms, but only when $x$ is equal to one;
(B) about 30 to about 92 mole percent of units of the structure

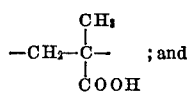

(C) about 5 to about 65 mole percent of units of the structure

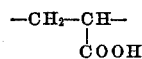

10. The photographic element of claim 9 wherein the units of part A are of the structure

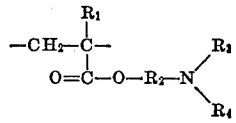

wherein $R_1$ is hydrogen or a methyl radical, $R_2$ is an alkylene radical of from one to six carbon atoms, and $R_3$ and $R_4$ are independently selected from the group consisting of alkyl radicals of from one to eight carbon atoms.

11. The photographic element of clami 10 wherein $R_1$, $R_3$ and $R_4$ are methyl radicals.

12. The photographic element of claim 11 wherein $R_2$ is an ethylene radical.

13. The photographic element of claim 9 wherein the units of part A are of the structure

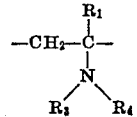

wherein $R_1$ is hydrogen or a methyl radical and $R_3$ and $R_4$ are taken together and represent the atoms necessary to form an imidazole or substituted imidazole ring.

14. The photographic element of claim 13 wherein $R_3$ and $R_4$ are taken together to form an imidazole ring.

15. The photographic element of claim 14 wherein the imidazole ring is a methyl-substituted imidazole ring.

References Cited
UNITED STATES PATENTS

| | | | |
|---|---|---|---|
| 2,611,763 | 9/1952 | Jones | 96—114 |
| 3,449,123 | 6/1969 | Kondo et al. | 96—114 |

FOREIGN PATENTS

| | | | |
|---|---|---|---|
| 889,760 | 2/1962 | Great Britain | 96—114 |

RONALD H. SMITH, Primary Examiner

UNITED STATES PATENT OFFICE
CERTIFICATE OF CORRECTION

Patent No. 3,813,251          Dated  May 28, 1974

Inventor(s)  Kenneth R. Hollister and Ernest J. Perry

It is certified that error appears in the above-identified patent and that said Letters Patent are hereby corrected as shown below:

Column 4, line 56, change "-CH$_2$-O" to -- 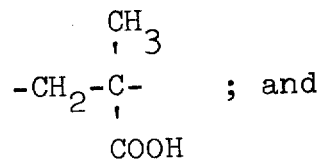 --;

Line 66, change "-CH$_2$-O-" to -- CH$_2$=C--.

Column 8, line 56, "Percy" should read --Perry--; Line 49, "of" should read --in--.

Column 12, line 15 (claim 5) after the structure should be inserted:

--wherein R$_1$ is hydrogen or a methyl radical and R$_3$ and R$_4$ are taken together and represent the atoms necessary to form an imidazole or substituted imidazole ring;

B. about 30 to about 92 mole percent of units of the structure

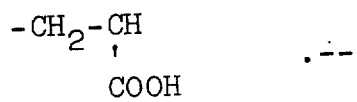     ; and

C. about 5 to about 65 mole percent of units of the structure $$-CH_2-\underset{COOH}{CH}$$  .--

UNITED STATES PATENT OFFICE
CERTIFICATE OF CORRECTION

Patent No. 3,813,251　　　　　Dated May 28, 1974

Inventor(s) Kenneth R. Hollister and Ernest J. Perry

It is certified that error appears in the above-identified patent and that said Letters Patent are hereby corrected as shown below:

Column 12, line 28 (claim 8) the "O" in the structure should be --C--.

Column 14, line 6, "clami" should read ---claim---.

Signed and sealed this 6th day of May 1975.

(SEAL)
Attest:

RUTH C. MASON
Attesting Officer

C. MARSHALL DANN
Commissioner of Patents
and Trademarks